(12) United States Patent
Hunger et al.

(10) Patent No.: US 11,267,161 B2
(45) Date of Patent: Mar. 8, 2022

(54) WOOD TREATMENT DEVICE FOR THE PRESSURE-FREE TREATMENT OF WOOD AND A PRESSURE-FREE METHOD FOR TREATING WOOD

(71) Applicant: IML Instrumenta Mechanik Labor GmbH, Wiesloch (DE)

(72) Inventors: Erich Hunger, Karlsruhe (DE); Sebastian Hunger, Wiesloch (DE); Fabian Hunger, Leimen (DE)

(73) Assignee: IML Instrumenta Mechanik Labor GmbH, Wiesloch (DE)

( * ) Notice: Subject to any disclaimer, the term of this patent is extended or adjusted under 35 U.S.C. 154(b) by 492 days.

(21) Appl. No.: 16/305,411

(22) PCT Filed: Jun. 9, 2017

(86) PCT No.: PCT/EP2017/000673
§ 371 (c)(1),
(2) Date: Nov. 29, 2018

(87) PCT Pub. No.: WO2017/211459
PCT Pub. Date: Dec. 14, 2017

(65) Prior Publication Data
US 2020/0324434 A1 Oct. 15, 2020

(30) Foreign Application Priority Data
Jun. 10, 2016 (DE) ..................... 10 2016 007 093.5

(51) Int. Cl.
*B27K 3/02* (2006.01)
*B27K 3/00* (2006.01)
*A01G 7/06* (2006.01)

(52) U.S. Cl.
CPC ............ *B27K 3/0257* (2013.01); *B27K 3/002* (2013.01); *B27K 3/0235* (2013.01); *A01G 7/06* (2013.01); *B27K 2240/20* (2013.01)

(58) Field of Classification Search
None
See application file for complete search history.

(56) References Cited

U.S. PATENT DOCUMENTS 1,999,458 A * 4/1935 Hollister .................. A01G 7/06
47/57.5
3,706,161 A 12/1972 Jenson
(Continued)

FOREIGN PATENT DOCUMENTS

DE 2 021 647 1/1971
DE 2 254 242 5/1974
(Continued)

*Primary Examiner* — David P Turocy
(74) *Attorney, Agent, or Firm* — Gudrun E. Huckett

(57) ABSTRACT

The present invention relates to a wood treatment device (1) for treating wood, and to a method for treating wood. Said wood treatment device (1) comprises a cylindrical hollow body (2) having inner end which is inside the wood when in use, and an outer end facing away from the inner end and at least one outlet opening (4). The cylindrical hollow body (2) comprises a receiving space (20') which is designed to receive a carrier material (20) containing a wood treatment agent. Said wood treatment device (1) also comprises a thrust pin (10) which extends along the longitudinal axis of the cylindrical hollow body (2), and which can be moved outside of the cylindrical hollow body (2) on the outer end. Said thrust pin (10) comprises at least one closure section (11, 12) which closes at least one outlet opening when the wood treatment device (1) is not in use, and when the wood treatment device (1) is in use, the at least one outlet opening is released after moving and the receiving chamber is brought into contact with the wood.

13 Claims, 3 Drawing Sheets

(56) References Cited

U.S. PATENT DOCUMENTS

| | | | | |
|---|---|---|---|---|
| 6,484,440 B2 * | 11/2002 | Brown | ................... | A01G 7/06 47/57.5 |
| 8,677,684 B1 * | 3/2014 | Doolittle | ................. | A01G 7/06 47/57.5 |
| 2016/0235015 A1 * | 8/2016 | Merving | ................. | A01G 7/06 |
| 2017/0212095 A1 | 7/2017 | Hunger et al. | | |

FOREIGN PATENT DOCUMENTS

| | | | | |
|---|---|---|---|---|
| DE | 10 2014 015 051 | | 10/2015 | |
| FR | 2 259 534 | | 8/1975 | |
| FR | 2 260 430 | | 9/1975 | |
| SE | 356 921 | | 6/1973 | |
| WO | 93/08694 | | 5/1993 | |
| WO | WO-2008039122 A1 * | | 4/2008 | ............... A01G 7/06 |

\* cited by examiner

WOOD TREATMENT DEVICE FOR THE PRESSURE-FREE TREATMENT OF WOOD AND A PRESSURE-FREE METHOD FOR TREATING WOOD

BACKGROUND OF THE INVENTION

The invention concerns a wood treatment device for the treatment of wood and a method for the treatment of the wood.

It is known in the prior art that wood poles, tree trunks, and other wood objects are subjected to a check from time to time with which the condition of the existing wood, its impregnation and/or further properties that are decisive for the stability and bearing capacity are examined. In this context, the examination of decay in the interior is an important examination with regard to stability. Further examinations are performed by means of drilling resistance measurements.

DE 10 2014 015 051 B3 discloses a wood testing tool and a method that enables an examination of the impregnation depth of impregnated wood in that the wood testing tool is driven into the wood and thereby a wood sample is stamped out that can be subjected to a visual inspection By means of such examinations, it is determined how much the wood is damaged and whether the remaining healthy wood is sufficient for the stability.

When the wood is damaged too much, the pole must be replaced or the tree must be felled. A treatment of the wood has hardly been possible up to now.

Furthermore, it is known in the prior art that, for depth treatment of wood, impregnation liquid is introduced into the wood under high pressure by means of a device. Such a device is disclosed, for example, in DE 2 021 647 U. This impregnation is to be performed preventively and is very complex due to the requirement of high pressures.

Moreover, fungicides are known that themselves contain fungi and are used for treating wood affected by decay or for prevention. Such a fungicide is disclosed, for example, in WO 93/08694.

Based on this prior art, it is the object of the present invention to provide a device that enables in a simple way a treatment of wood in which decay has been detected.

SUMMARY OF THE INVENTION

This object is solved by a wood treatment device embodied for long-term treatment of wood, comprising a cylindrical hollow body with an inner end that during use is positioned inside the wood, an outer end which is facing away from the inner end, and at least one outlet opening, wherein the cylindrical hollow body comprises a receiving space that is embodied for receiving a carrier material with active agent for wood treatment. The wood treatment device further comprises a thrust pin which extends along the longitudinal axis of the cylindrical hollow body and which is displaceable at the outer end from outside of the cylindrical hollow body, wherein the thrust pin comprises at least one closure section which closes off the at least one outlet opening in a state of non-use of the wood treatment device, and, in a state of use of the wood treatment device, after displacement, releases the at least one outlet opening and brings the receiving space into contact with the wood.

The further object, a method for treatment of wood affected by decay, is solved by the method for treatment of wood, wherein a wood treatment device as described above is employed, wherein the method comprises the steps of:

a) providing the wood treatment device;
b) applying the corresponding active agent for wood treatment to the carrier material of the wood treatment device and introducing the carrier material with the active agent for wood treatment into the receiving space of the wood treatment device;
c) driving the wood treatment device into the wood;
d) displacing the thrust pin, thereby opening the outlet openings and bringing into contact the receiving space with the wood, thereby releasing the active agent for wood treatment;
e) leaving behind the wood treatment device.

Further embodiments are disclosed in the dependent claims.

A first embodiment relates to a wood treatment device that is configured to treat wood. This means in this context the treatment of wood in the form of wood poles or other wood objects but also the treatment of living wood in tree trunks or branches.

The wood treatment device comprises a cylindrical hollow body with an inner end, an outer end, at least one outlet opening as well as a thrust pin and a receiving space. The receiving space is embodied for receiving a carrier material with active agent for wood treatment. The inner end of the cylindrical hollow body is configured to be positioned during use within the wood and the outer end at the end of cylindrical hollow body facing away from the inner end. The thrust pin which extends along the longitudinal axis of the cylindrical hollow body is displaceable from outside of the cylindrical hollow body, from the exterior side, and comprises at least one closure section which, in a state of non-use, closes off the at least one outlet opening and, in a state of use of the wood treatment device after the displacement, releases the at least one outlet opening and brings the receiving space into contact with the wood. The displacement can be in this context a movement of the thrust pin along the longitudinal axis but also a rotation about this axis or a mixed rotation-thrust movement.

The wood treatment device is pushed into the wood or driven in for use so that the outlet openings come to rest in or near the sites to be treated. Subsequently, the thrust pin is displaced and the outlet opening(s) thereby released. The displacement of the thrust pin can be realized by pushing the cylindrical hollow body in with a finger or a punch but also by an outwardly projecting end of the thrust pin. In this way, the receiving space is connected with the surrounding wood. The carrier material can be displaced together with the thrust pin so that it is partially pushed into the outlet openings or the receiving space is enlarged by the displacement of the thrust pin so that the carrier material spreads out in the enlarged receiving space. With or without direct contact of the carrier material with the wood, the active agent for wood treatment can spread from the carrier material and migrate to the wood. The wood treatment device remains in the wood so that the active agent for wood treatment can spread for an extended period of time and must not be pressed at high pressure into the desired regions.

This means in particular that the thrust pin serves only to open or release in a targeted fashion the single or several outlet opening(s), and it means furthermore that the device is designed such that a substance which is located in the receiving space passes into the wood solely by release of the openings. In this context, "passing" is to be understood as a pressureless migration, i.e., without pressure as it is exerted in a piston-cylinder system of a syringe or the like. The thrust pin according to the invention is no piston and also does not act as one; other pressure means are also not used.

Correspondingly, the device according to the invention requires also no nozzle or similar auxiliary means for pressure-dependent dispensing of the wood treatment substance. In contrast to pushing in a piston in a cylinder, as in a syringe, which is understood herein as under "high pressure" and which, depending on the force application, can be performed at "very high pressure", the thrust pin is understood herein as being actuatable "quasi pressureless", the rotational insertion serves only for releasing the openings. Pushing in or pressing in the wood treatment substance is not desired because the structure of the wood is not to be influenced by pressure, in particular not negatively influenced.

The wood treatment can be a preventive treatment but also a treatment of damaged regions, for example, regions with decay caused by fungi. When a site that has been infested with fungi is to be treated, it is possible to employ an antagonist. This means that a different wood fungus is used which does not damage the wood but is so dominant that it displaces the harmful fungus. This antagonist spreads like the harmful fungus in the wood; not only days but weeks and months will pass in this context. Important in this context is only that the antagonist spreads faster than the harmful fungus so that the harmful fungus is displaced before damage to the wood is too great.

This antagonist, or another wood treatment agent, is received in a carrier material. In this context, the carrier material can be a solid and absorb the active agent but can also be in liquid state wherein the active agent is introduced into this liquid. The carrier material is delivered to the receiving space and the receiving space is closed by the thrust pin.

In an embodiment, the wood treatment device is provided with a receiving space already filled with carrier material and active agent for wood treatment so that it can be immediately put to use. Conceivable are wood treatment devices which can be employed for different applications, preventive or against an infestation, which are provided with different active agents. In this context, very specific active agents as well as broadly acting active agents, biological or chemical products and carrier materials are possible. For example, the active agent for wood treatment, when containing an antagonist, develop its action over an extended period of time; therefore, "long-term treatment" also means the longer time period that is required so that a fungus colony such as the one of an antagonist can grow against a harmful fungus. Thus, "long-term" is a relative term which may mean at least several days, even several weeks or months, depending on the environmental conditions such as weather, harmful fungus infestation, distribution of the harmful fungus/spreading etc.

Thus, "remaining in the wood" of the device refers to it remaining in the wood at the site of treatment even for weeks and months or even permanently. In further embodiments of the wood treatment device, the end face located at the inner end of the cylindrical hollow body forms an outlet opening. This outlet opening is closed off in the state of non-use by a drive-in tip which is present at the inner end of the thrust pin. The drive-in tip in this variant is one of the closure sections. After a displacement of the thrust pin, an annular gap is released through which the receiving space comes into contact with the wood. The drive-in tip facilitates in this context the driving-in action or insertion of the wood treatment device in that it displaces the interfering wood.

However, the end face which is positioned at the inner end of the hollow cylindrical body can also be closed off so that the outlet opening(s) are present exclusively at the wall surface of the cylindrical hollow body. In this embodiment, it is possible to design the thrust pin such that the latter can be removed from the cylindrical hollow body, filled again with carrier material with active agent for wood treatment, and reinserted into the cylindrical hollow body.

In this context, the now closed end face of the cylindrical hollow body can be designed in various forms. In a variant, the end face forms a drive-in tip.

The outlet openings of the cylindrical hollow body positioned at the wall surface can have various forms. For example, they can be holes or slotted holes that are drilled into the hollow body, but also slots in longitudinal or transverse direction.

Conceivable are also slots that are wound helically along the wall surface or polygonal cutouts. The number and arrangement of these outlet openings can be selected to be different. For example, one or several rows of outlet openings but also randomly or non-uniformity distributed outlet openings are possible.

The thrust pin comprises closure sections matching the number and arrangement of the outlet openings with which the outlet openings in the state of non-use can be closed off. For example, the closure sections can extend radially from a central axis or a central cylinder in outward direction. These radially positioned prisms have as base surface the shape of the outlet openings or a base surface which projects past them so that the outlet openings can be completely covered. When the thrust pin is displaced in the state of use, these closure sections are pushed away from the outlet openings so that the outlet openings are released.

The closure sections can however also be designed to have a larger surface area so that one closure section closes off several outlet openings. For example, a disk-shaped closure section can close off simultaneously all outlet openings that are positioned on a circumferential line and also release them by a displacement in axial direction.

The closure sections but also the remaining parts of the thrust pin can either be formed such that a single receiving space within the cylindrical hollow body is present that has correlated therewith one or several outlet openings or can divide the space such that several smaller receiving spaces are present that each have at least one outlet opening correlated therewith. Conceivable is also a division into several receiving spaces arranged in axial direction one after another which are brought into contact with the wood through the same outlet openings, respectively, in that the thrust pin is displaced bit by bit. Depending on the embodiment of the device, receiving spaces can be "switched on" successively across the duration of the treatment in that the corresponding outlet openings which are correlated with the receiving space are released or opened. Due to the long-term residence of the device in the wood, the treatment can thus be performed across longer periods of time that may amount to days, weeks but also months.

The outer end of the cylindrical hollow body comprises a head. This head can be a flattened drive-in head so that the wood treatment device can be driven, for example, by means of a hammer, into the wood. This is advantageous in case of massive wood because otherwise the cylindrical hollow body by being hit with the hammer may be deformed and this may lead to the thrust pin no longer being displaceable. They head may however also be embodied like a type of grip which enables gripping, with the fingers, the wood treatment device. For example, knob-like or ball-shaped grips are possible.

In one embodiment, the wood treatment device is configured such that it closes off water-tightly the hole into which it is inserted for wood treatment or which has been created by the driving-in action. In this way, the penetration of further moisture which favors spreading of decay can be prevented.

At the outer side of the wall surface of the cylindrical hollow body, the wood treatment device can be provided also with anchoring means that secure the wood treatment device in the state of use. These anchoring means can be embodied barb-shaped so that they enable insertion or a driving-in action but no pulling out or sliding out of the wood treatment device. By means of the anchoring means, the cylindrical hollow body forms a type of an anchor plug which is anchored in a hole. This is advantageous especially when the device is not to be removed from the wood at all.

The wood treatment device can be produced of various materials. In an embodiment, the cylindrical hollow body is comprised of aluminum and the thrust pin of brass. However, also other advantageously harder materials are possible with which a higher strength for driving into massive wood is achieved. For wood treatment of living wood in tree trunks or branches, for example, parts of stainless steel can be produced so that a corrosion or migration of components into the wood can be excluded. When the hardness is not decisive in case of the presence of a hole in which the wood treatment device is to be received, variants of wood or plastic material are conceivable also.

The method according to the invention for the treatment of wood is carried out with use of a wood treatment device according to the invention. The method comprises the following steps:

a) providing the wood treatment device;
b) applying the corresponding active agent for wood treatment to the carrier material of the wood treatment device and introducing the carrier material with the active agent for wood treatment into the receiving space of the wood treatment device;
c) driving the wood treatment device into the wood;
d) displacing the thrust pin, thereby opening the outlet openings and bringing into contact the receiving space with the wood, thereby causing release of the active agent for wood treatment;
e) leaving behind the wood treatment device.

In a further method according to the invention, in step c) the wood treatment device is driven into a hole that is present in the wood. In this context, this hole may have been created by removal of a wood sample, by a drilling resistance measurement or a similar wood testing action, or specifically drilled for the treatment. The hole can have been already present in the wood for an extended period of time or can have been created shortly before introducing the wood treatment device.

In a further development of the method, prior to step a) the following steps are performed:

a') removing a wood sample of the wood for examination in respect to decay;
a") examination of the wood sample with respect to causative fungus type;
a'") selecting suitable active agents for wood treatment.

Moreover, the method can comprise the introduction of the selected active agent for wood treatment. It is not decisive in this context whether the removal and examination of the wood sample is carried out with temporal spacing relative to the wood treatment or immediately before.

In the wood treatment, the wood treatment device must not be inserted or driven completely into the wood. It is instead expedient that the wood treatment device is driven only to a predetermined depth into the wood so that the outlet openings are positioned such that the carrier material and thus the active agent for wood treatment is released in a targeted fashion in and adjacent to the affected site or the site to be treated preventively.

BRIEF DESCRIPTION OF THE DRAWINGS

Further embodiments as well as some of the advantages that are associated with these and further embodiments will become apparent and better understood by the following detailed description with reference to the accompanying Figures.

Objects or parts thereof which are substantially identical or similar may be provided with the same reference characters. The Figures are only a schematic illustration of an embodiment of the invention.

Figure 1:
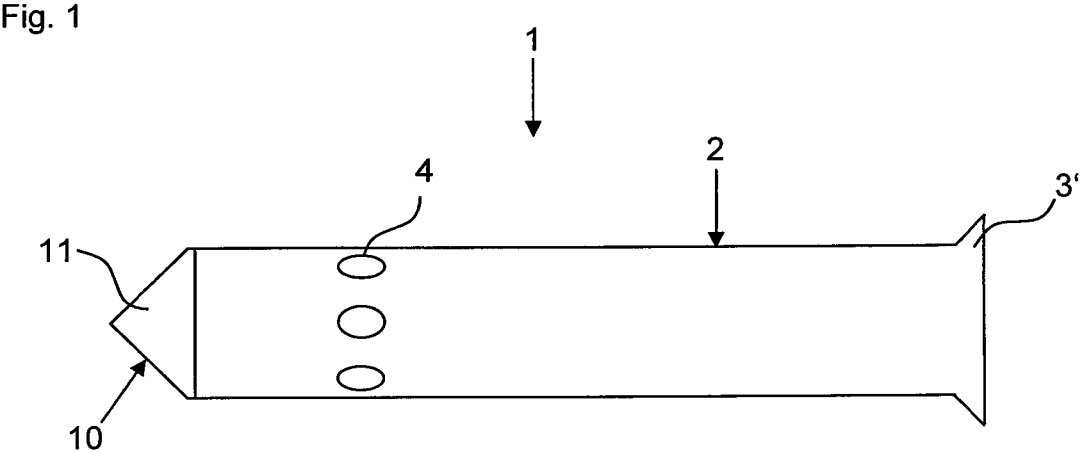
Figure 2:
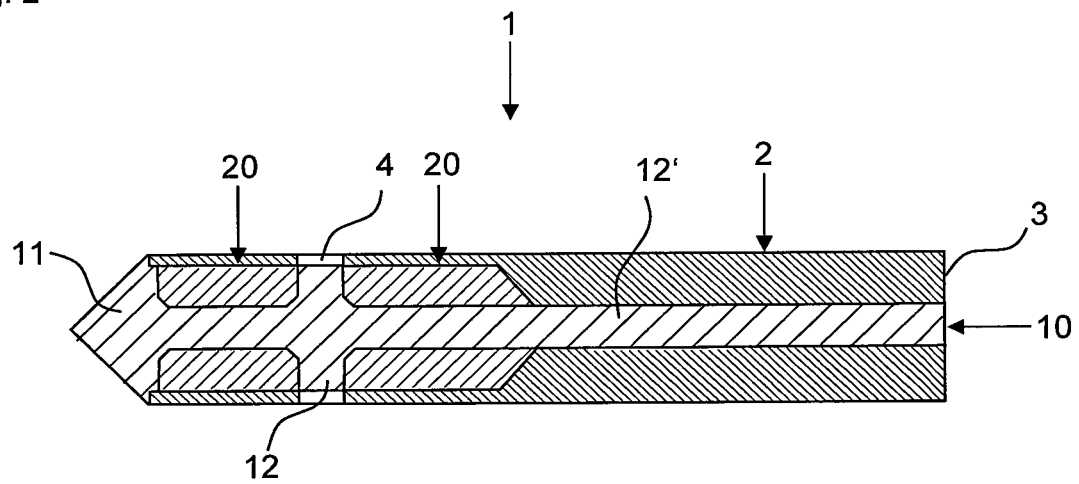
Figure 3:
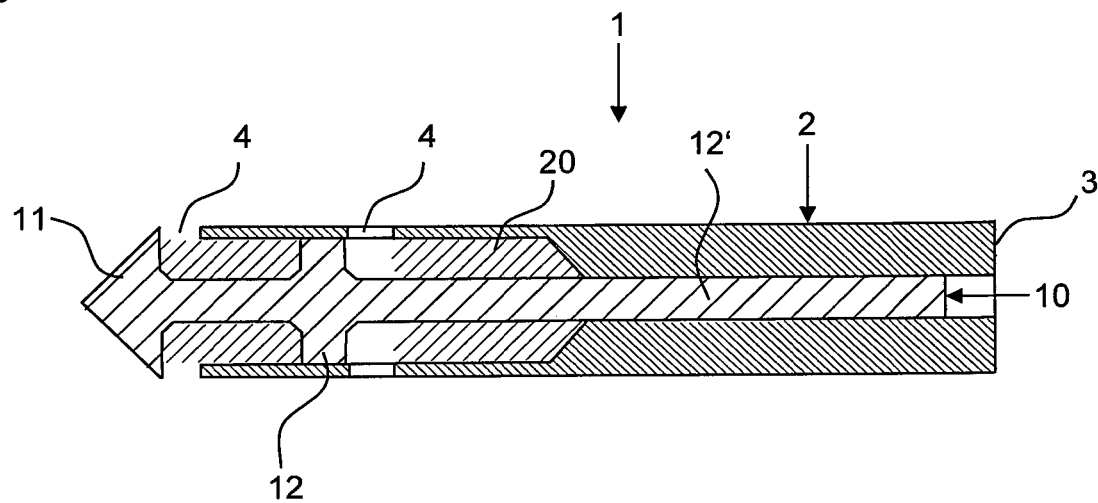
Figure 4:
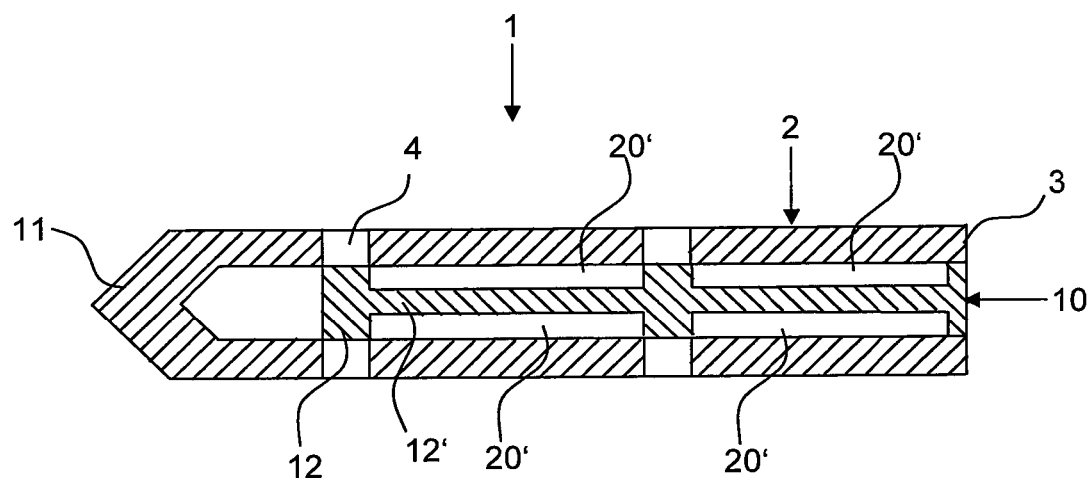
Figure 5:
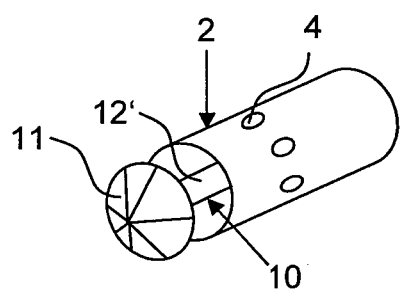
Figure 6:
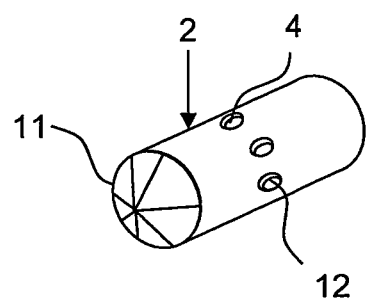
Figure 7:
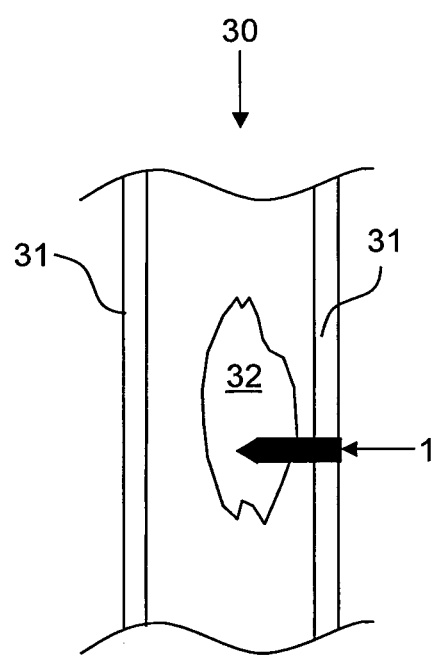

It is shown in:

FIG. 1 a side view of a wood treatment device;
FIG. 2 a longitudinal section of a wood treatment device in arrangement of non-use;
FIG. 3 a longitudinal section of a wood treatment device in arrangement of use with pushed-in thrust pin;
FIG. 4 a longitudinal section of a wood treatment device without outlet opening at the end face;
FIG. 5 a perspective detail view of a wood treatment device with pushed-in thrust pin;
FIG. 6 a perspective detail view of a wood treatment device in arrangement of non-use;
FIG. 7 a longitudinal section through an impregnated piece of wood with decay.

DESCRIPTION OF PREFERRED EMBODIMENTS

The device according to the invention relates to a wood treatment device 1 as shown in FIG. 2. This wood treatment device 1 is composed of a cylindrical hollow body 2 and a thrust pin 10. In this context, at least a receiving space 20' is formed which can receive carrier material 20 with an active agent for wood treatment. In this context, embodiments are possible in which the carrier material 20 with the active agent for wood treatment is still to be introduced into the receiving space/receiving spaces 20' but also finish-filled wood treatment devices 1 for different applications with different active agents for wood treatment which are selected for the respective application. The cylindrical hollow body 2 has an inner end that is located within the wood during application and an outer end which is facing away therefrom as well as at least one outlet opening 4. This at least one outlet opening 4, in the state of non-use, is closed off by at least one closure section 12 of the thrust pin 10 and, in the state of use, can be released by displacement of the thrust pin 10 and thus of the closure section 12. The thrust pin 10 extends along the longitudinal axis of the cylindrical hollow body 2 and is displaceable from outside of the cylindrical hollow body 2.

FIG. 3 shows the wood treatment device 1 of FIG. 2 with displaced thrust pin 10. In the illustrated embodiment, the cylindrical hollow body 2 has an outlet opening 4 at its end face positioned at the inner end and several outlet openings 4 at its wall surface which are distributed on a circumferential line. These outlet openings 4 are closed off or released by the closure sections 12 of the thrust pin 10, respectively. As cannot be differentiated in the illustration, in this context the closure section 12 can close off several outlet openings 4, in FIG. 2 and FIG. 3 all of the outlet openings 4 positioned on the wall line of the cylindrical hollow body 2, wherein the closure section 12 has a disk-shaped form which extends from a central cylinder of the thrust pin 10 radially in outward direction, or several closure sections 12 close off one outlet opening 4, respectively, wherein the closure sections 12 comprise a prism shape with the shape of the respective outlet opening 4 as a base surface and extend also radially from the central cylinder of the thrust pin 10 to the cylindrical hollow body 2 in outward direction. Other variants of the closure sections 12, where another shape is selected so that one or several outlet openings 4 can be closed off, respectively, are not illustrated. For example, annular configurations are possible or those in which the thrust pin 10 has no central element but connects the closure sections 12 by webs or a cage-like structure.

The end face outlet opening 4 is closed off or released by a closure section 12. This closure section 12 is configured as a drive-in tip 11 in the illustrated embodiment. In this way, the drive-in tip 11 is part of the thrust pin 10. By displacement of the thrust pin 10, the drive-in tip 11 is lifted off the cylindrical hollow body 2 and the receiving space 20' positioned there behind is opened and is brought into contact with the wood in the state of use. The drive-in tip 11 facilitates penetration of the wood treatment device 1 into the wood. It is thus also possible to drive the wood treatment device 1 into massive wood, similar to driving in a nail.

This embodiment is also illustrated in FIGS. 5 and 6. In this context, FIG. 6 shows the wood treatment device 1 in the closed state of non-use. In this case, the outlet openings 4 at the wall surface of the cylindrical hollow body 2 are closed off like the outlet opening 4 at the end face. In FIG. 5, the open state is illustrated as it occurs within the wood in the state of use. Here, the outlet opening 4 at the end face and the outlet openings 4 at the wall surface are released.

The outlet openings 4 can have various shapes. In FIG. 2 and FIG. 3, oval outlet openings 4 in the wall surface of the cylindrical hollow body 2 are illustrated. However, they can also have round, polygonal, elongate or other shapes that can be produced. Thus, different shapes of the outlet openings 4 within one wood treatment device 1 are possible also. Also, the number of outlet openings 4 can vary; only a single outlet opening 4 can be present just as well as a plurality of outlet openings 4 which can be distributed in certain arrangements, such as one or several rows, or helically but also irregularly. Also, a variant exclusively with an end face outlet opening 4 is possible.

FIG. 4 shows an embodiment of the wood treatment device 1 in which the cylindrical hollow body 2 at its end face which is positioned at the inner side is closed off so that here no outlet opening 4 is existing. The inner side of the cylindrical hollow body 2 forms the drive-in tip 11. Thus, the thrust pin 10 can be displaced in the cylindrical hollow body 2 without it having to be driven farther into the wood. In the illustrated embodiment it is even possible to remove the thrust pin 10 from the cylindrical hollow body 2 and to optionally exchange or renew the carrier material 20 with the active agent for wood treatment.

Further developed embodiments are not illustrated in which the thrust pin 10 is displaced in several steps and thus gradually releases further or other outlet openings 4 and thus also connects other receiving spaces 20' with the wood. In this context, the thrust pin 10 can be designed in very different ways. For example, the closure sections 12 can be shaped such that one or a few large receiving spaces 20' are formed that are correlated with one or several outlet openings 4 or several receiving spaces 20' are formed that each are correlated with at least one outlet opening 4. Also, the thrust pin 10 can be designed such that it is displaced by rotational movement about its longitudinal axis. In this way, several receiving spaces 20' which extend along the longitudinal axis can be connected by elongate outlet openings 4 with the wood.

FIG. 1 shows an embodiment in which the outer end of the cylindrical hollow body 2 comprises a head 3 which is configured as a flattened drive-in head 3'. This flattened drive-in head 3' forms the impact surface when the wood treatment device 1 must be driven into massive wood or a smaller hole.

The head 3 can be designed in various ways. Instead of the flattened drive-in head 3', an open end of the cylindrical hollow body 2 can also form the head. In this context, the outer end of the cylindrical hollow body 2 can be designed such that a simple pushing in of the thrust pin 10 or a better access to the thrust pin 10 is ensured. An embodiment that is also not illustrated comprises as a head 3 a grip with which the wood treatment device 1 can be held between the fingers so that it can be introduced more easily into a hole in the wood. This grip can be designed ball-shaped or knob-like or can be even ergonomically matched to the shape of the fingers during gripping.

FIG. 7 shows the state of use of the wood treatment device 1. In this context, the wood treatment device 1 is introduced into a wood pole or into a trunk 30 which comprises an impregnated region 31 and an infested region 32. In this context, the wood treatment device 1 is introduced into the wood such that it reaches the infested region 32 and the outlet openings 4 are positioned in or near this region, and the active agent for wood treatment can thus spread from there.

In this context, the wood treatment device 1 must not mandatorily be driven completely into the wood. The penetration depth can be selected such that the outlet openings 4 are positioned in the desired position. The wood treatment device 1 can be designed such that it closes off water-tightly the hole into which it has been inserted or that is created by the driving-in action. In this way, penetration of water can be prevented.

For anchoring or fastening in the wood, the wood treatment device 1 can comprise anchoring means. They are advantageously provided at the outer side of the wall surface of the cylindrical hollow body 2 and secure the wood treatment device 1 in the wood. These anchoring means are not illustrated in the Figures.

LIST OF REFERENCE CHARACTERS

1 wood treatment device
2 cylindrical hollow body
3 head
3' flattened drive-in head
4 outlet opening
10 thrust pin
11 drive-in tip
12 closure section
20 carrier material
20' receiving space
30 pole/tree trunk
31 impregnated region
32 infested region

What is claimed is:
1. A wood treatment device for a long-term treatment of wood, the wood treatment device comprising:
a cylindrical hollow body comprising an inner end and an outer end facing away from the inner end, wherein the inner end, when the wood treatment device is in use, is positioned inside the wood;

the cylindrical hollow body further comprising an open end face at the inner end, wherein the open end face forms a first outlet opening configured to be positioned in or near regions of the wood that are to be treated;

the cylindrical hollow body further comprising a wall surface and a second outlet opening arranged at the wall surface and configured to be positioned in or near regions of the wood that are to be treated;

the cylindrical hollow body further comprising a receiving space delimited in a radial outward direction by the wall surface and configured to receive a carrier material provided with an active agent for wood treatment;

a thrust pin arranged inside the cylindrical hollow body and comprising a central cylinder, the central cylinder extending along a longitudinal axis of the cylindrical hollow body and comprising a first end arranged at the inner end and a second end arranged at the outer end, wherein the thrust pin is configured to be displaced inside the cylindrical hollow body and is configured to be acted on at the outer end of the cylindrical hollow body from outside of the cylindrical hollow body;

the thrust pin comprising a first closure section connected to the first end of the central cylinder and a second closure section connected to the central cylinder at a spacing from the first end and extending radially outwardly from the central cylinder toward the wall surface of the cylindrical hollow body, wherein the first closure section closes off the first outlet opening and the second closure section closes off the second outlet opening in a state of non-use of the wood treatment device and wherein, in a state of use of the wood treatment device, the thrust pin, when displaced, releases the first outlet opening and the second outlet opening and brings the receiving space into contact with the wood.

2. The wood treatment device according to claim 1, wherein the carrier material provided with the active agent for wood treatment is disposed in the receiving space.

3. The wood treatment device according to claim 2, wherein the active agent for wood treatment is a wood fungus acting as an antagonist, wherein the carrier material is an absorber and the antagonist is contained in an absorbed state in the absorber, or the carrier material is a liquid containing the antagonist.

4. The wood treatment device according to claim 1, wherein the thrust pin comprises a drive-in tip arranged at the inner end of the cylindrical hollow body, wherein the drive-in tip is the first closure section that closes off the first outlet opening.

5. The wood treatment device according to claim 1, wherein the second outlet opening arranged at the wall surface is round or elongate.

6. The wood treatment device according to claim 1, wherein a plurality of the second outlet openings are provided, regularly or irregularly arranged, across the wall surface.

7. The wood treatment device according to claim 6, wherein a plurality of the second closure sections extend radially from the central cylinder of the thrust pin toward the cylindrical hollow body to close off the plurality of the second outlet openings in the state of non-use.

8. The wood treatment device according to claim 7, wherein the plurality of the second closure sections are individual pins in a prismatic shape or have a common disk-shaped or ring-shaped form.

9. The wood treatment device according to claim 1, wherein the outer end of the cylindrical hollow body comprises a head, wherein the head is a flattened drive-in head or a grip configured to grip the wood treatment device with fingers.

10. The wood treatment device according to claim 1, wherein the wood treatment device is configured to close off water-tightly, in the state of use, a hole into which the wood treatment device is inserted or which has been created by driving in the wood treatment device into the wood.

11. The wood treatment device according to claim 1, wherein the wall surface of the cylindrical hollow body comprises external anchoring means wherein the anchoring means are configured to secure the wood treatment device in the state of use in the wood.

12. The wood treatment device according to claim 1, wherein the cylindrical hollow body is comprised of aluminum and the thrust pin is comprised of brass.

13. The wood treatment device according to claim 1, wherein the cylindrical hollow body and the thrust pin are comprised of stainless steel.

* * * * *